(12) United States Patent
Miyazaki

(10) Patent No.: US 7,884,879 B2
(45) Date of Patent: Feb. 8, 2011

(54) IMAGE SENSING APPARATUS HAVING EXPOSURE CONTROL AND METHOD THEREFOR

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 486 days.

(21) Appl. No.: 11/848,352

(22) Filed: Aug. 31, 2007

(65) Prior Publication Data

US 2008/0062275 A1 Mar. 13, 2008

(30) Foreign Application Priority Data

Sep. 13, 2006 (JP) .............................. 2006-248574

(51) Int. Cl.
H04N 5/238 (2006.01)
(52) U.S. Cl. ..................................... 348/364
(58) Field of Classification Search ................. 348/364, 348/365
See application file for complete search history.

(56) References Cited

U.S. PATENT DOCUMENTS

| | | | | |
|---|---|---|---|---|
| 5,774,747 A | * | 6/1998 | Ishihara et al. ................. | 396/61 |
| 6,690,424 B1 | * | 2/2004 | Hanagata et al. ............. | 348/364 |
| 7,616,233 B2 | * | 11/2009 | Steinberg et al. ......... | 348/222.1 |
| 2004/0119874 A1 | * | 6/2004 | Imai ............................ | 348/362 |
| 2006/0245007 A1 | * | 11/2006 | Izawa et al. .................. | 358/448 |
| 2007/0052840 A1 | * | 3/2007 | Okuno ........................ | 348/364 |
| 2008/0310713 A1 | * | 12/2008 | Fukuda ........................ | 382/167 |
| 2010/0214429 A1 | * | 8/2010 | Usui et al. ............... | 348/222.1 |

FOREIGN PATENT DOCUMENTS

| | | | |
|---|---|---|---|
| JP | 05-022653 | | 1/1993 |
| JP | 2000-075351 A | | 3/2000 |
| JP | 2002-251380 | | 9/2002 |
| JP | 2003-107555 | | 4/2003 |
| JP | 2004-004361 A | | 1/2004 |
| JP | 2004004449 A | * | 1/2004 |
| JP | 2005051407 A | * | 2/2005 |

* cited by examiner

*Primary Examiner*—John M Villecco
(74) *Attorney, Agent, or Firm*—Cowan, Liebowitz & Latman, P.C.

(57) ABSTRACT

In an image sensing apparatus and exposure control method, detecting an object that satisfies a certain preset condition from image data obtained by image sensing with an image sensing element, and carrying out photometry on the image data as a whole to acquire an overall photometric value while carrying out photometry on an area of a detected object within the image data to acquire an object photometric value. An exposure value is then determined based on the overall photometric value and the object photometric value, with exposure controlled during image sensing based on the determined exposure value.

10 Claims, 8 Drawing Sheets

FACE UNDEREXPOSED
BACKGROUND OVEREXPOSED

FACE PROPERLY EXPOSED
BACKGROUND OVEREXPOSURE WORSENS

IMAGE SENSING APPARATUS HAVING EXPOSURE CONTROL AND METHOD THEREFOR

BACKGROUND OF THE INVENTION

1. Field of the Invention

The present invention relates to an image sensing apparatus and an exposure control method, and more particularly, to an image sensing apparatus capable of detecting an object from a sensed image, and an exposure control method therefore.

2. Description of the Related Art

Conventionally, in a digital camera, there is an image sensing apparatus equipped with an automatic exposure control function that determines exposure automatically based on image data obtained by image sensing.

As photometric methods carried out for the purpose of automatic exposure control, there is, for example, evaluative photometry carried out by taking the entire frame into consideration, as well as multi-division photometry, in which a photometric area within the frame is divided into a plurality of blocks and photometry carried out in blocks. Besides these methods, there is center-weighted photometry, in which photometry is carried out with emphasis on the center portion of the frame, as well as spot photometry, in which photometry is carried out only for an arbitrary range of the center portion of the frame.

In addition, in order to get the luminance correct for a main object, there are apparatuses in which the user specifies the area in which the main object is present and the apparatus adjusts the exposure to match the specified area. Further, a camera that automatically detects, for example, a face as the main object by a technique such as shape analysis from image data obtained by image sensing and carries out exposure control so that the detected face is properly exposed has been proposed (see, for example, Japanese Patent Laid-Open No. 2003-107555). Such a camera brightens the entire frame if the face is underexposed even though the luminance of the frame overall is proper, and darkens the frame overall if the face is overexposed (see FIG. 7). Consequently, image sensing such that the luminance of the main object is proper no matter what the scene can be carried out.

However, with the method disclosed in Japanese Patent Laid-Open No. 2003-107555, in attempting to control the exposure so that the luminance of the detected face is proper, it sometimes happens that the background becomes overexposed or underexposed even though the luminance of the face is correct (see, for example, FIG. 8). In such cases, the image is not properly exposed when looked at as a whole.

Although image processing of such improperly exposed images to adjust the brightness is also conventionally done, in general, image contrast after processing is worse in overexposed images than in underexposed images, resulting in many cases in images that appear to be blurred.

SUMMARY OF THE INVENTION

The present invention has been made in consideration of the above situation, and has as its object to reduce overexposure of the background when carrying out automatic exposure control based on detection results for a main object.

According to the present invention, the foregoing object is obtained by providing an image sensing apparatus comprising: a detection unit to detect an object that satisfies a certain preset condition from image data obtained by image sensing with an image sensing element; a first photometry unit to carry out photometry on the image data as a whole and acquire an overall photometric value as a photometric result; a second photometry unit to carry out photometry on an area of an object detected by the detection unit and acquire an object photometric value as a photometric result; a determination unit to compare the overall photometric value and the object photometric value and determine an exposure value such that a higher of the overall photometric value and the object photometric value approaches a certain preset value; and an exposure control unit to control exposure during image sensing based on the exposure value determined by the determination unit.

According to the present invention, the foregoing object is also obtained by providing an image sensing apparatus control method comprising: a detection step of detecting an object that satisfies a certain preset condition from image data obtained by image sensing with an image sensing element; a first photometry step of carrying out photometry on the image data as a whole and acquiring an overall photometric value as a photometric result; a second photometry step of carrying out photometry on an area of an object detected in the detection step and acquiring an object photometric value as a photometric result; a determination step of determining an exposure value based on the overall photometric value and the object photometric value; and an exposure control step of controlling exposure during image sensing based on the exposure value determined in the determination step.

Further features of the present invention will become apparent from the following description of exemplary embodiments with reference to the attached drawings.

DESCRIPTION OF THE EMBODIMENT

A preferred embodiment of the present invention will be described in detail in accordance with the accompanying drawings.

Figure 1:
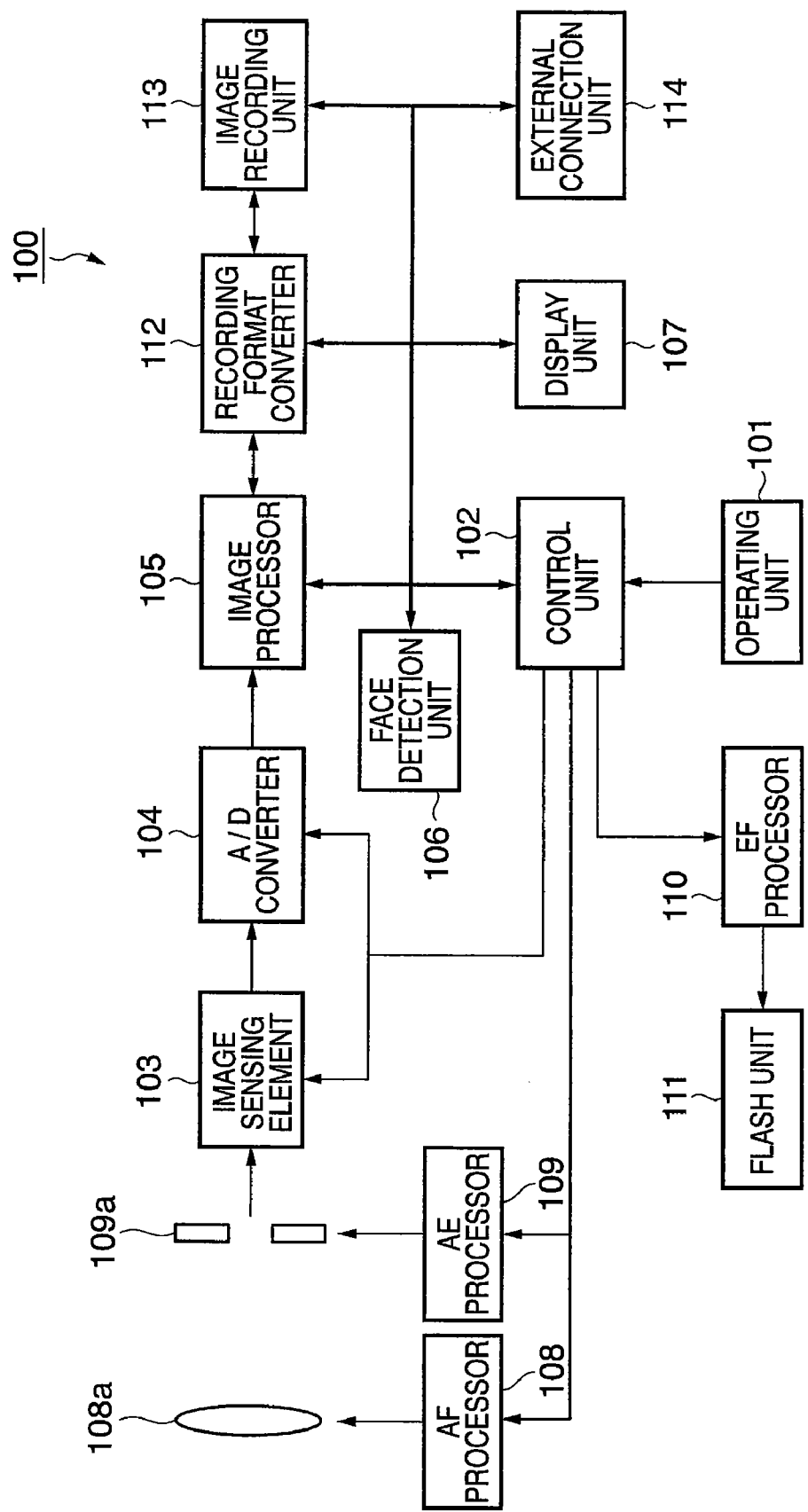
FIG. 1 is a block diagram showing schematically a configuration of a digital camera of an embodiment of the present invention.

In the present embodiment, a description is given of an arrangement in which a digital camera is used as an image sensing apparatus. FIG. 1 is a block diagram showing the functional configuration of a digital camera 100 according to the present embodiment.

In FIG. 1, reference numeral 101 designates an operating unit, composed of switches, buttons and the like that an operator of the digital camera 100 manipulates to input a variety of instructions. A shutter switch is also included in the operating unit 101. In a state in which the shutter switch is partially operated (for example, depressed halfway), a switch SW1 that instructs image sensing preparation is turned ON and a control unit 102 is notified by the operating unit 101. When the shutter switch is fully depressed, a switch SW2 is turned ON and the control unit 102 is notified by the operating unit 101.

Reference numeral 102 designates the control unit, which controls the operations of the various parts of the digital camera 100 shown in FIG. 1 and controls the components in response to instructions from the operating unit 101.

Reference numeral 103 designates an image sensing element, as typified by a CCD or a CMOS sensor, and 108a designates a lens. Although for convenience the lens 108a is shown as a single lens in FIG. 1, in reality, it is composed of a plurality of lenses including a focus lens. In addition, 109a designates an exposure mechanism, including a mechanical shutter. The image sensing element 103 receives light entering through the lens 108a and the exposure mechanism 109a and outputs an electrical charge that corresponds to the amount of light received.

An analog/digital (A/D) converter 104 performs sampling, gain adjustment, A/D conversion and the like on analog image signals output from the image sensing element 103 and outputs the processing result as digital image signals.

An image processor 105 performs various types of image processing on the digital image signals output from the A/D converter 104 and outputs processed digital image signals. For example, the image processor 105 converts digital image signals received from the A/D converter 104 into YUV image signals for output.

Reference numeral 106 designates a face detection unit, 108 designates an AF processor that adjusts the focus by controlling the focus lens of the lens 108a, and 109 designates an AE processor that controls exposure by controlling the exposure mechanism 109a.

The face detection unit 106 detects an area of a face of a person as a main object from an image indicated by the digital image signals output from the image processor 105, and reports information pertaining to this area to the control unit 102. The control unit 102, when it receives this information, instructs the AF processor 108 to position a focus frame at the area of the face of the person detected in the image, and at the same time instructs the AE processor 109 to adjust the exposure of the area of the face of the person so that the exposure is proper. Based on an instruction from the control unit 102, the AF processor 108 adjusts the position of the focus lens included in the lens 108a, and at the same time the AE processor 109 adjusts the exposure mechanism 109a.

In addition, in the event that the control unit 102 determines that a flash is necessary, the control unit 102 instructs an EF processor 110 to turn the flash on. The EF processor 110, when it receives a flash-on instruction, controls a flash unit 111, causing it to fire.

A display unit 107 is composed of a small liquid crystal display screen or the like, and displays images in accordance with image data processed by the image processor 105.

A recording format converter 112 converts a recording format of the digital image signals (the image data) output from the image processor 105 to a recording format such as JPEG, and outputs it to an image recording unit 113. The image recording unit 113 carries out a process of recording the recording-format-converted image data received from the recording format converter 112 in a memory, not shown, in the digital camera 100, or in an external memory inserted in the digital camera 100.

An external connection unit 114 functions as an interface for connecting the digital camera 100 to an external device such as a PC (personal computer) or a printer.

Next, a description is given of the operation of the digital camera 100 having the configuration described above.

Figure 2:
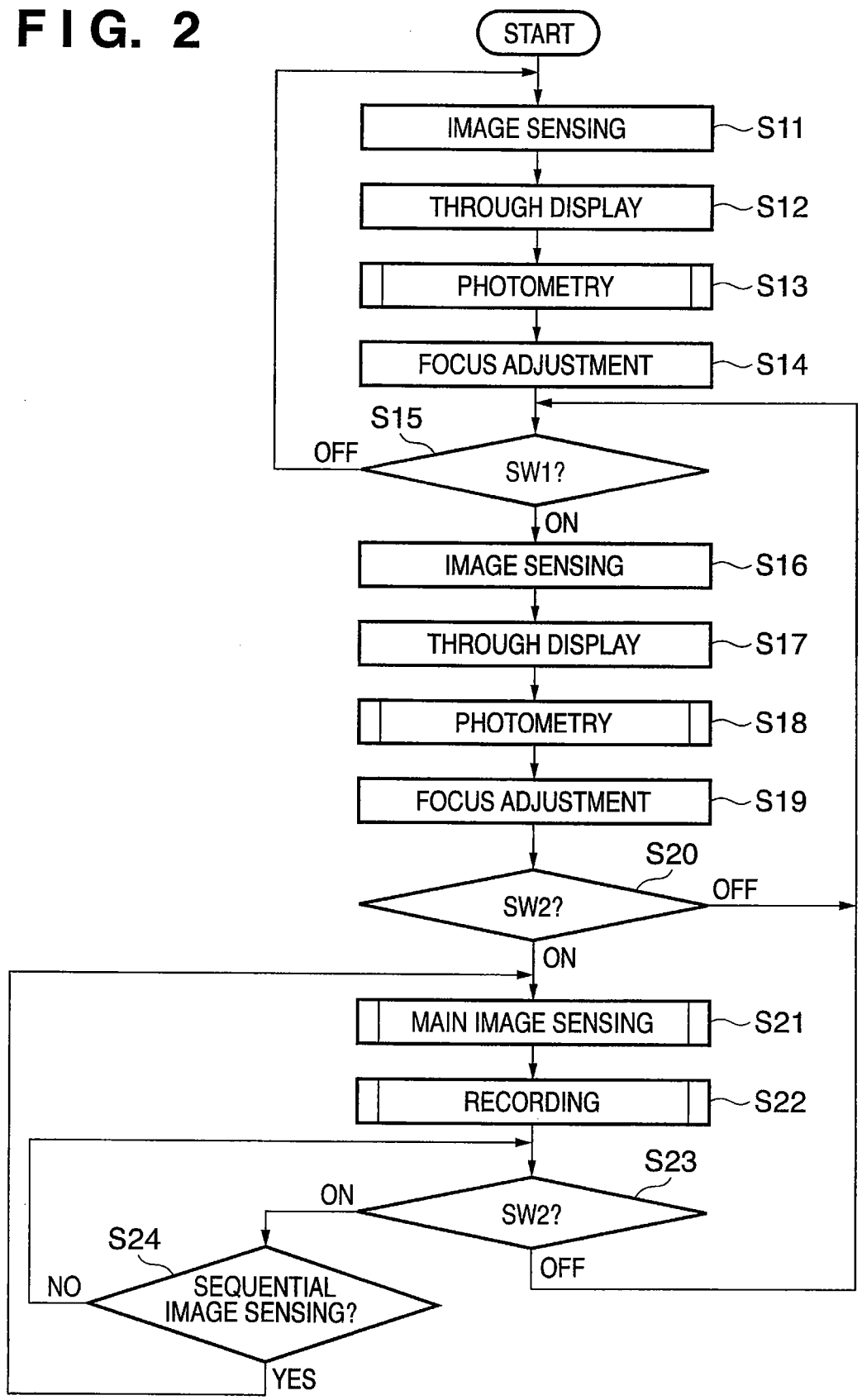
FIG. 2 is a flow chart illustrating a main routine of an image sensing mode of the digital camera of the embodiment of the present invention.

FIG. 2 is a flow chart illustrating a main routine of an image sensing mode of the digital camera 100 of the present embodiment, executed when a power switch included in the operating unit 101 is turned ON and the image sensing mode is selected.

In a state in which the power switch is ON, when power is supplied to the parts that compose the digital camera 100, the shutter included in the exposure mechanism 109a opens, allowing light to enter the image sensing element 103 through the lens 108a and the exposure mechanism 109a. In such a state, an image sensing process is carried out in step S11. Here, first, the image sensing element 103 is exposed and electrical charges accumulated for a predetermined time period by electronic shutter control are read out and output as analog image signals to the A/D converter 104. The A/D converter 104 performs sampling, gain adjustment, and A/D conversion on the analog image signals output from the image sensing element 103 and outputs the results as digital image signals to the image processor 105. The image processor 105 then performs various types of image processing on the digital image signals. The image-processed digital image signals are then stored temporarily in a memory, not shown.

Next, in step S12, the digital image signals stored in the memory are read out and displayed on the display unit 107 (through-display). An electronic viewfinder (EVF) function can be achieved by thus displaying the obtained image signals in succession on the display unit 107.

In step S13 a photometry process is performed. A detailed description is now given of the photometry process performed in the present embodiment, with reference to FIG. 3.

First, digital image signals stored in the memory in step S11, not shown, are read out and a luminance of the entire frame is calculated (step S31).

Then, in step S32 a determination is made as to whether or not to perform face detection. In the present embodiment, whether or not to carry out face detection may be set in advance using the operating unit 101. When set to not carry out face detection (face detection OFF), processing proceeds to step S38 and an exposure value at which the luminance is proper is calculated using the control unit 102 based on the luminance of the entire frame obtained in step S31. The control unit 102 stores the calculated exposure value in the memory, not shown.

By contrast, when set to carry out face detection processing (face detection ON) (YES at step S32), processing proceeds to step S33 and face detection is carried out. Here, the face detection unit 106 detects an area of a face of a person from an image indicated by the digital image signals obtained in step S11, and reports information relating to this area, such as the position and size of the detected face (face information), to the control unit 102. The face detection method is not limited to any particular method, and any known method may be used. A technique that uses learning typified by a neural network, as well as a technique that searches for distinctive portions of shapes such as the eyes, nose, or mouth using template matching from an image area and deeming the area a face if the degree of similarity is high may, be given as examples of typical face detection methods.

In addition, many other techniques have been also proposed, such as a technique that detects such image feature amounts as the color of the skin and the shape of the eyes and performs statistical analysis, and ordinarily a plurality of such techniques are combined to carry out face recognition. Specifically, a method that uses wavelet transform and image feature amount for face detection as described in Japanese Patent Laid-Open No. 2002-251380 may be cited as one such example. It should be noted that the control unit 102, when it receives the face information, instructs the AF processor 108 to move a position of a focus frame used in a focus adjustment process to be described later to the area of the face of the person in the image. Based on this instruction, the AF processor 108 adjusts the position of the lens 108a.

Next, in step S34, face detection process results obtained in step S33 are checked to determine whether or not a face has been detected. If there is no face in the image or face detection fails (specifically, face information is not obtained), then processing proceeds to step S38 and the processes described above are carried out. On the other hand, if there is a face in the image and face detection succeeds (specifically, face information is obtained), then processing proceeds to step S35.

In step S35, the control unit 102 calculates the luminance of the face area detected in step S33 from the digital image signals obtained in step S11.

Figure 6:
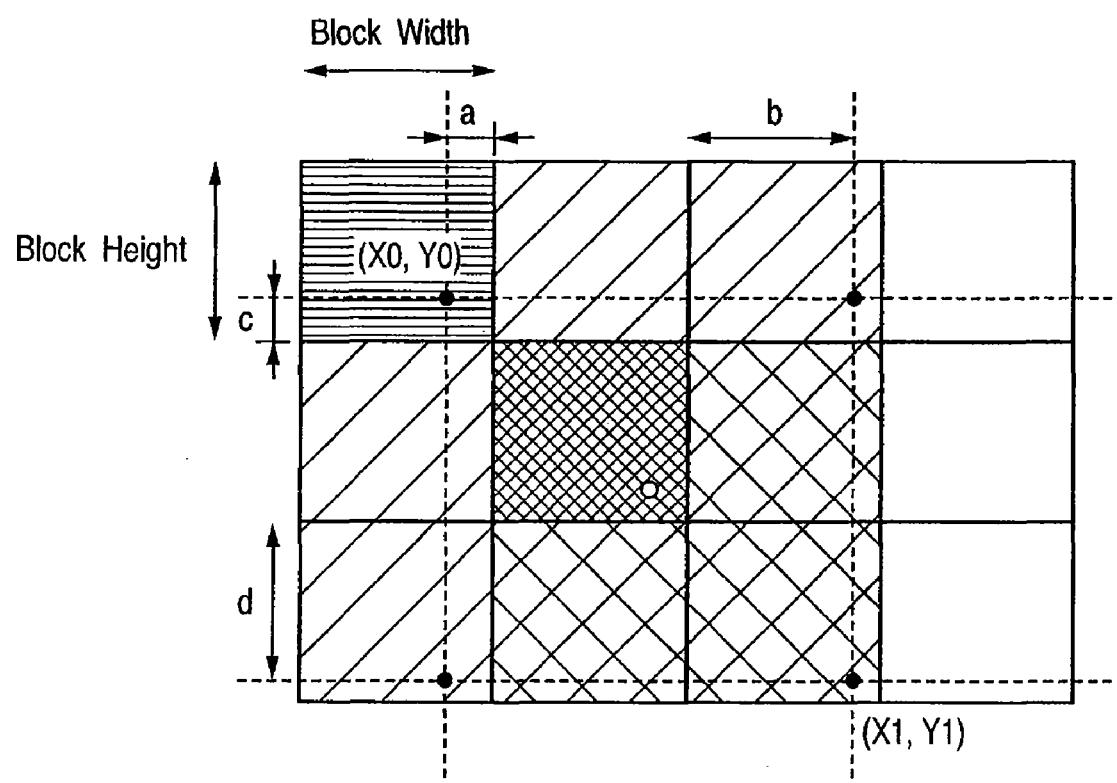
FIG. 6 shows schematic diagrams for the purpose of illustrating face weight in the embodiment of the present invention.
Figure 7:
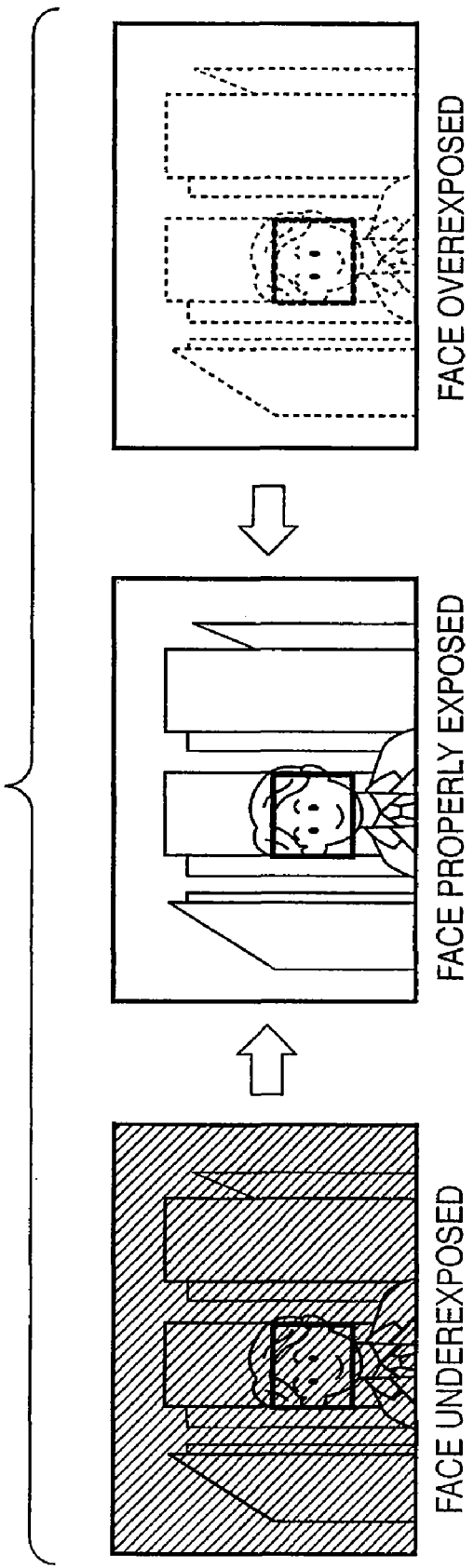
FIG. 7 shows schematic diagrams for illustrating conventional exposure control using face detection.
Figure 8:
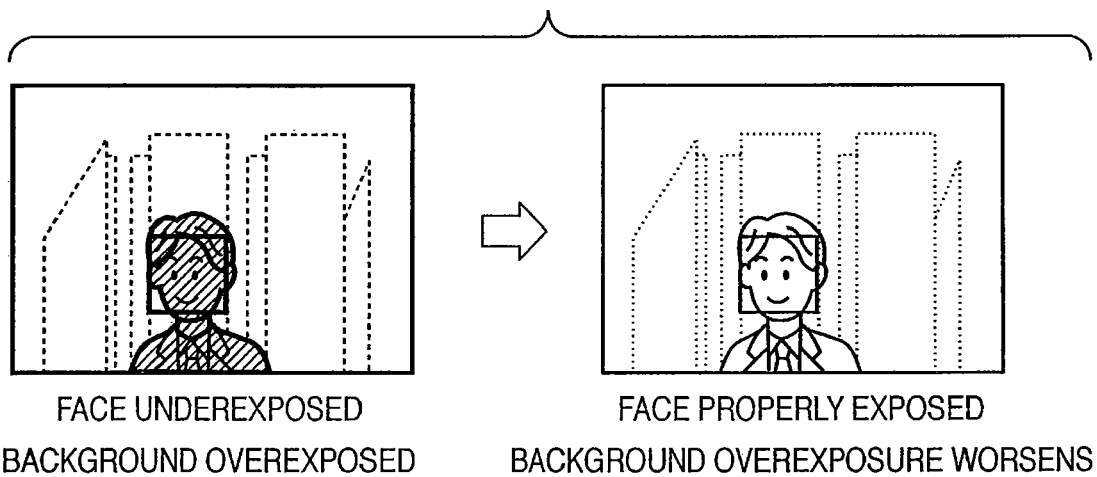
FIG. 8 shows schematic diagrams for illustrating problems with conventional exposure control using face detection.

It should be noted that, in order to obtain the luminance of the face area, the control unit 102 creates a "face weight". A description of face weight calculation follows, with reference to FIG. 6.

First, the origin of the face area is set as (X0,Y0) and the endpoint of the face area is set as (X1,Y1). It should be noted that although in the present embodiment the origin is given as (X0,Y0) and the endpoint as (X1,Y1), the origin and the endpoint are not limited thereto. With these points, it is determined in which photometric frame/frames are the four coordinates of the face area. After this determination is made, the face weight is obtained for each block according to that block's proportion of the total surface area of the face area. For example, in FIG. 6, the face area spreads across nine photometric frames, with a weight W of a lower right block obtained using the following formula:

$$W = DefaultWei \times (b/blockWidth \times c/blockHeight)$$

DefaultWei = reference face weight

The control unit 102 calculates the luminance of the face area using the face weight obtained in the manner described above.

Next, in step S36 comparison is made of the luminance of the entire frame calculated in step S31 and the luminance of the face area calculated in step S35. If the luminance of the face area is higher than the luminance of the entire frame, then a setting of an exposure value such that the luminance of the face area approaches a face luminance target value previously set in advance is carried out (step S37). For example, if the luminance of the face area is higher than the target value, then the exposure value is lowered. Conversely, if the luminance of the face area is lower than the target value, then the exposure value is raised. If the luminance of the entire frame is higher than the luminance of the face area, then a setting of the exposure value such that the luminance of the entire frame approaches a target value previously set in advance is carried out (step S38). The control unit 102 stores the exposure values set in step S37 or step S38 in the memory, not shown.

Thus, as described above, because when carrying out face detection exposure is controlled so that, of the luminance of the entire frame and the luminance of the face area, that with the higher luminance is made to approach a target value, overexposure can be prevented. It should be noted that the target value for the luminance may either be set to the same value for the face area and for the entire frame or may be set to different values for the face are and for the entire frame.

Figure 3:
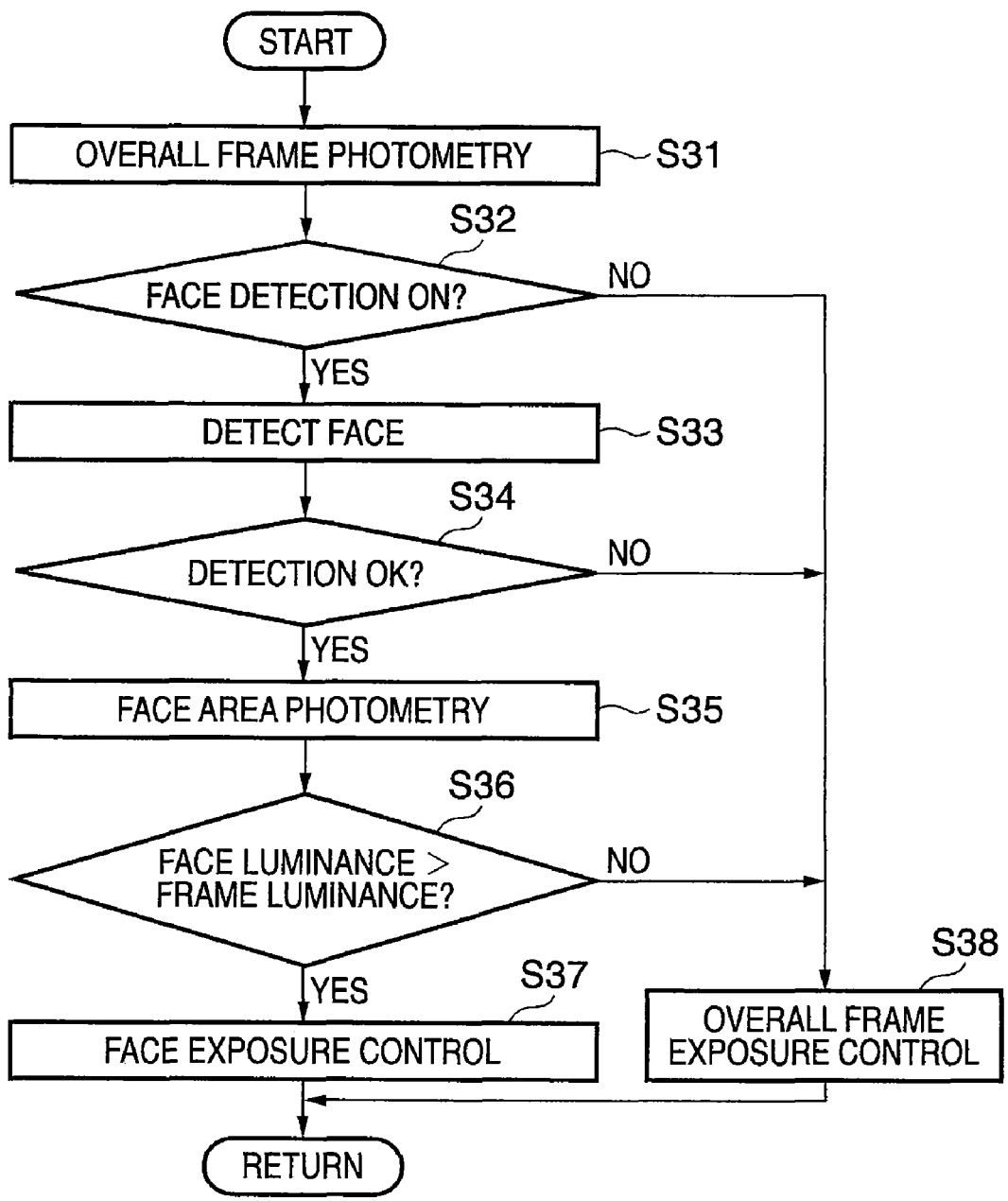
FIG. 3 is a flow chart illustrating a photometry process of the embodiment of the present invention.

When the photometry process shown in FIG. 3 ends, processing proceeds to step S14 shown in FIG. 2.

In step S14, if a face is detected during the photometry process of step S13, the control unit 102 carries out focus adjustment so that the focus of the focus lens of the lens 108a is on the face detected. If no face is detected during the photometry process of step S13, the control unit 102 carries out a known focus adjustment.

Next, in step S15, a status of the shutter switch included in the operating unit 101 is checked. If the shutter switch is not pressed and switch SW1 is OFF, then processing returns to step S11 and the above-described processes are repeated. It should be noted that image sensing using the exposure value obtained in step S13 is carried out in the image sensing process of step S11 when the above-described processes are repeated. The control unit 102 reads out the exposure value from the memory and controls the AE processor 109 based on the read-out exposure value. The AE processor 109 controls the exposure mechanism 109a based on the instruction from the control unit 102.

By contrast, if switch SW1 is ON, then processing proceeds to step S16 and preparation for main image sensing is carried out. In steps S16 to S19, the same processes are carried out as in steps S11 to S14 described above. However, in the image sensing process of step S16, first, image sensing is carried out using the exposure value obtained in step S13. In addition, depending on the results of the photometry process of step S18, if necessary a flash flag is set and setting of the flash is carried out as well. It should be noted that determining whether or not to fire the flash need not be carried out on the basis of the results of the photometry, and alternatively, for example, the flash may be set to fire in advance using the operating unit 101. In addition, ambient darkness may be sensed and the determination made automatically.

When the focus adjustment process of step S19 ends, processing proceeds to step S20 and the status of switch SW2 is determined. If switch SW2 is OFF, processing returns to step S15. If switch SW1 is ON, then the processes of steps S16 to S19 described above are repeated. It should be noted that, with a second and subsequent routines while switch SW1 is ON, the image sensing of step S16 is carried out using the exposure value obtained in step S18. If in step S15 it is further determined that switch SW1 is also OFF, then processing returns to step S11. By contrast, if switch SW2 is ON (YES at step S20), then processing proceeds to step S21.

In step S21, a main image sensing processes executed. In the main image sensing process, sensed image data is written to the memory, not shown, via the image sensing element 103, the A/D converter 104, and the image processor 105. A detailed description of the main image sensing process of step S21 is given later using FIG. 4.

When the main image sensing process ends, processing proceeds to step S22, the control unit 102 reads out the image data written into the memory, and executes a development process that carries out various types of image processing. Further, after the image data is converted to a predetermined recording format by the recording format converter 112, a recording process is executed by the image recording unit 113 that writes the image data to a recording medium, not shown, or to the memory (step S22). A detailed description of the recording process of step S22 is given later using FIG. 5.

When the recording process (step S22) ends, the control unit 102 determines the status of the switch SW2 (step S23). If switch SW2 is ON, then the control unit 102 determine the status of a sequential image sensing flag stored in a memory, not shown, of the control unit 102 (step S24). If the sequential image sensing flag has been set, then processing returns to step S21 in order to carry out main image sensing sequentially and subsequent main image sensing is carried out. If the sequential image sensing flag has not been set (NO at step S24), then processing returns to step S23 and the turning of switch SW2 OFF is awaited. When switch SW2 is turned OFF, processing returns to step S15.

Figure 4:
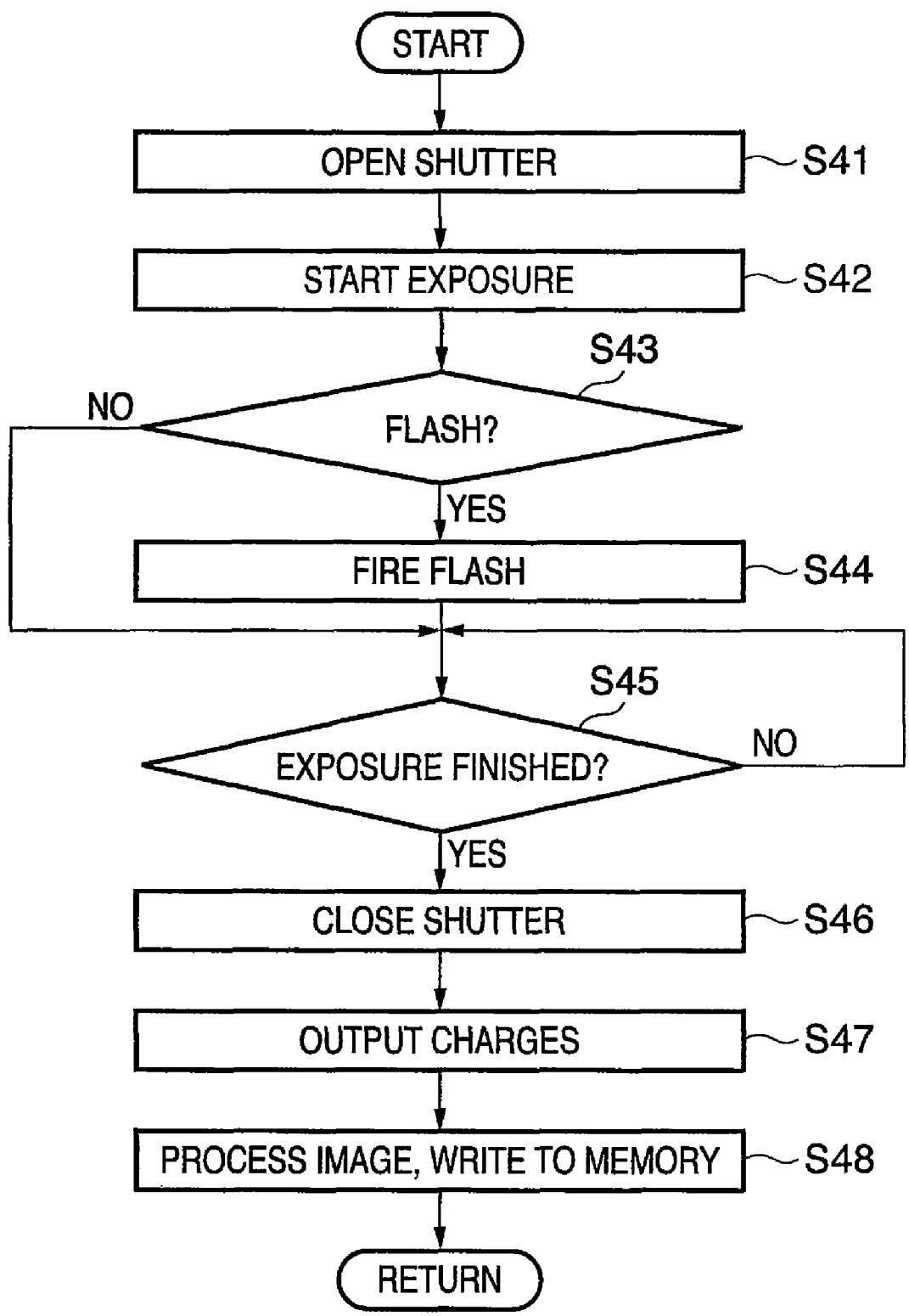
FIG. 4 is a flow chart illustrating an image sensing routine of the embodiment of the present invention.

FIG. 4 is a detailed flow chart of the main image sensing carried out in step S21 shown in FIG. 2.

The control unit 102 reads out the exposure value acquired in step S18 and stored in the memory, not shown, and causes the AE processor 109 to set the exposure mechanism 109a aperture to the aperture value that corresponds to the read-out exposure value and release the shutter according that aperture value (step S41). Then, exposure of the image sensing element 103 is begun (step S42). It should be noted that the image sensing element 103 is reset either just before or just after release of the shutter in order to discard unneeded electrical charges.

In step S43, a check is made to determine whether or not the flash flag is set and if the flash is required or not. When firing the flash, the control unit 102 controls the EF processor 110, causing it to cause the flash unit 111 to carry out a pre-flash, calculates the flash amount, and weights an EF frame. Then, the control unit 102 causes the flash unit 111 to fire at a main flash amount calculated using the pre-flash (step S44).

Next, the control unit 102 awaits the end of exposure of the image sensing element 103 in accordance with the exposure value (step S45) and causes the AE processor 109 to close the shutter of the exposure mechanism 109a (step S46). The control unit 102 then reads out the accumulated electrical charge signals from the image sensing element 103 and outputs them as analog image signals to the A/D converter 104 (step S46). The A/D converter 104 performs sampling, gain adjustment, A/D conversion and the like on the analog image signals read out from the image sensing element 103 and outputs the results as digital image signals. Next, the image processor 105 performs various types of image processing on the digital image signals output from the A/D converter 104 and writes the processed digital image signals to the memory, not shown (step S48). When this series of processes ends, the main image sensing routine (step S21) is finished.

Figure 5:
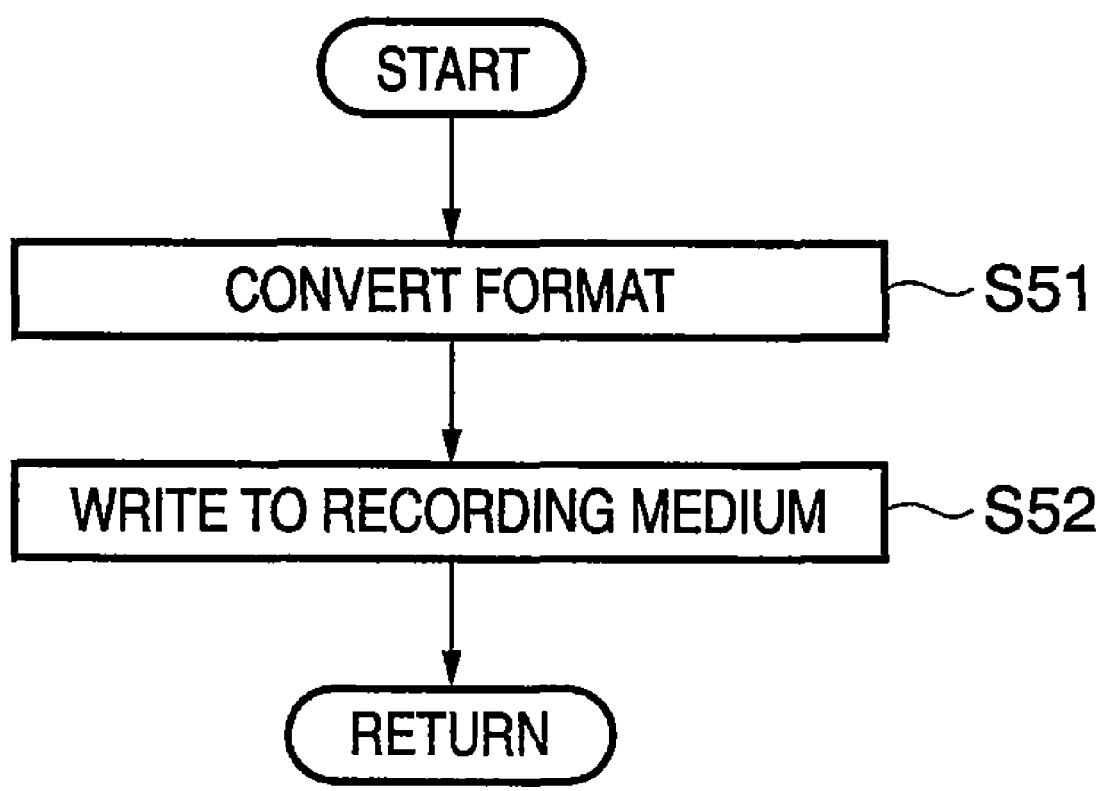
FIG. 5 is a flow chart illustrating a recording routine of the embodiment of the present invention.

FIG. 5 is a detailed flow chart of the recording process of step S22 shown in FIG. 2.

In step S51, the image-processed digital image signals are converted into image data of a recording format such as JPEG by the recording format converter 112 and output to the image recording unit 113. Then, the image recording unit 113 writes the recording format-converted image data to an external recording medium, not shown, such as a memory card or a CompactFlash (registered trademark) card, or to an internal recording medium (step S52). Once writing to the recording medium is finished, the recording process routine step S22 is finished.

In addition, in the present embodiment, the photometric method and the focus adjustment method are set in advance using the operating unit 101 and executed. However, when the photometric method and the focus adjustment method are set to an auto mode, the photometric method and the focus adjustment method are set automatically and executed based on the presence or absence of a face or faces in the image, the number of faces (if any), the face area, the face position, and the orientation of the face, as well as luminance information for the entire image and image sensing information.

Although the embodiment of the present invention has been described as above with reference to the drawings, specific configurations thereof are not limited to this embodiment and other designs that do not exceed the scope and spirit of the present invention are included therewithin.

It should be noted that although the foregoing embodiment is described in terms of detection of a face as the main object, the present invention is not limited to the face as the main object of detection and is applicable to anything that detects an object that satisfies certain preset conditions.

Moreover, although the foregoing embodiment is described with reference to a case in which a single object (face) is detected, in the event that multiple objects (faces) are detected, the areas of each of the objects may be weighted based on certain preset conditions and the luminance calculated on the basis of the results of that weighting. As these preset conditions, for example, distance from the center of the frame, the size of the object (face), the reliability of object (face) detection, and whether or not that which is detected is a person registered in advance may be used. Of course, as can be appreciated by those of skill in the art, weighting may be carried out based on conditions other than those described, or, alternatively, weighting need not be carried out at all.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-248574, filed Sep. 13, 2006, which is hereby incorporated by reference herein in its entirety.

What is claimed is:

1. An image sensing apparatus comprising:
   a detection unit to detect an object that satisfies a certain preset condition from image data obtained by image sensing with an image sensing element;
   a first photometry unit to carry out photometry on said image data as a whole and acquire an overall photometric value as a photometric result;
   a second photometry unit to carry out photometry on an area of an object detected by said detection unit and acquire an object photometric value as a photometric result;
   a determination unit to compare said overall photometric value and said object photometric value, determine an exposure value that makes said overall photometric value approach a first target value in a case where said overall photometric value is higher than said object photometric value, and determine an exposure value that makes said object photometric value approach a second target value in a case where said object photometric value is higher than said overall photometric value; and
   an exposure control unit to control exposure during image sensing based on the exposure value determined by said determination unit.

2. The image sensing apparatus according to claim 1, wherein said second photometry unit divides a detected object area into areas and calculates the object photometric value while weighting each area based on a certain preset condition.

3. The image sensing apparatus according to claim 1, wherein, when multiple objects are detected by said detection unit, said second photometry unit carries out weighting of object areas of the respective objects based on a certain preset condition and calculates the object photometric value based on results of said weighting.

4. The image sensing apparatus according to claim 1, further comprising a flash controller to control a light amount of a flash according to the exposure value determined by said determination unit.

5. An image sensing apparatus control method comprising:
- a detection step of detecting an object that satisfies a certain preset condition from image data obtained by image sensing with an image sensing element;
- a first photometry step of carrying out photometry on said image data as a whole and acquiring an overall photometric value as a photometric result;
- a second photometry step of carrying out photometry on an area of an object detected in said detection step and acquiring an object photometric value as a photometric result;
- a determination step of comparing said overall photometric value and said object photometric value, determining an exposure value that makes said overall photometric value approach a first target value in a case where said overall photometric value is higher than said object photometric value, and determining an exposure value that makes said object photometric value approach a second target value in a case where said object photometric value is higher than said overall photometric value; and
- an exposure control step of controlling exposure during image sensing based on the exposure value determined in said determination step.

6. The image sensing apparatus control method according to claim 5, wherein in said second photometry step a detected object area is divided into areas and the object photometric value is calculated while weighting each area based on a certain preset condition.

7. The image sensing apparatus control method according to claim 5, wherein, when multiple objects are detected in said detection step, in said second photometry step weighting of object areas of the respective objects is carried out based on a certain preset condition and the object photometric value is calculated based on results of said weighting.

8. The image sensing apparatus control method according to claim 5, further comprising a flash control step of controlling a light amount of a flash according to the exposure value determined in said determination step.

9. An image sensing apparatus comprising:
- a detection unit to detect an object that satisfies a certain preset condition from image data obtained by image sensing with an image sensing element;
- a first photometry unit to carry out photometry on a predetermined area of the image data and acquire a first photometric value as a photometric result;
- a second photometry unit to carry out photometry on an area of an object detected by said detection unit and acquire a second photometric value as a photometric result;
- a determination unit to compare said first photometric value and said second photometric value, determine an exposure value that makes said first photometric value approach a first target value in a case where said first photometric value is higher than said second photometric value, and determine an exposure value that makes said second photometric value approach a second target value in a case where said second photometric value is higher than said first photometric value; and
- an exposure control unit to control exposure during image sensing based on the exposure value determined by said determination unit.

10. An image sensing apparatus control method comprising:
- a detection step of detecting an object that satisfies a certain preset condition from image data obtained by image sensing with an image sensing element;
- a first photometry step of carrying out photometry on a predetermined area of the image data and acquiring a first photometric value as a photometric result;
- a second photometry step of carrying out photometry on an area of an object detected in said detection step and acquiring a second photometric value as a photometric result;
- a determination step of comparing said first photometric value and said second photometric value, determining an exposure value that makes said first photometric value approach a first target value in a case where said first photometric value is higher than said second photometric value, and determining an exposure value that makes said second photometric value approach a second target value in a case where said second photometric value is higher than said first photometric value; and
- an exposure control step of controlling exposure during image sensing based on the exposure value determined in said determination step.

* * * * *